United States Patent [19]

Holler et al.

[11] 3,774,834

[45] Nov. 27, 1973

[54] BONDING APPARATUS

[75] Inventors: James A. Holler, Tonawanda; Eric F. Waeldchen, Williamsville, both of N.Y.

[73] Assignee: J and A Keller Machine Co., Inc., Tonawanda, N.Y.

[22] Filed: July 20, 1971

[21] Appl. No.: 164,252

[52] U.S. Cl. .......... 228/3, 29/471.1, 29/493, 29/497.5, 29/626, 228/4, 228/6

[51] Int. Cl. .......... B23k 21/00

[58] Field of Search .......... 29/243.57, 509, 471.1, 29/493, 497.5, 626; 228/3, 4, 6, 44

[56] References Cited

UNITED STATES PATENTS

| | | | |
|---|---|---|---|
| 1,548,177 | 8/1925 | Strange | 29/509 |
| 3,533,155 | 10/1970 | Coucoulas | 29/471.1 |
| 3,627,190 | 12/1971 | Ramsey | 29/497.5 X |
| 3,640,444 | 2/1972 | Ludwig | 228/4 |
| 3,696,985 | 10/1972 | Herring | 29/471.1 X |
| 3,699,640 | 10/1972 | Cranston et al. | 228/4 X |

*Primary Examiner*—J. Spencer Overholser
*Assistant Examiner*—Robert J. Craig
*Attorney*—Conrad Christel et al.

[57] ABSTRACT

A bonding apparatus and method for simultaneously bonding the leads of a beam-leaded device uniformly to conductive pads on a substrate. A continuous strip of metal consisting of a plurality of heat and pressure transmitting members is intermittently fed to a rotatable bonding head having a plurality of bonding tools. Each transmitting member is adapted to be interposed between the bonding tool and the leads of the beam-leaded device to evenly distribute and transmit bonding forces to such leads to effect uniform and simultaneous bonding thereof to their connections. A crimping device coacts with the bonding tools to partially deform a transmitting member about its respective tool prior to bonding.

16 Claims, 31 Drawing Figures

INVENTORS
James A. Holler and
BY Eric F. Waeldchen

Christel & Bean
ATTORNEYS.

INVENTOR.
James A. Holler and
BY Eric F. Waeldchen

Christel & Bean
ATTORNEYS.

INVENTORS
James A. Holler and
Eric F. Waeldchen
BY
Christel & Bean
ATTORNEYS.

PATENTED NOV 27 1973 3,774,834

SHEET 04 OF 10

INVENTORS
James A. Holler and
BY Eric F. Waeldchen

Christel & Bean
ATTORNEYS.

PATENTED NOV 27 1973 3,774,834

SHEET 05 OF 10

INVENTORS
James A. Holler and
BY Eric F. Waeldchen

Christel & Bean
ATTORNEYS.

INVENTORS
James A. Holler and
BY Eric F. Waeldchen
Christel & Bean
ATTORNEYS.

INVENTORS
James A. Holler and
BY Eric F. Waeldchen
Christel & Bean
ATTORNEYS.

INVENTORS
James A. Holler and
Eric F. Waeldchen
BY
Christel & Bean
ATTORNEYS.

INVENTORS
James A. Holler and
Eric F. Waeldchen
BY
Christel & Bean
ATTORNEYS.

INVENTORS
James A. Holler and
BY Eric F. Waeldchen
Christel & Bean
ATTORNEYS.

BONDING APPARATUS

BACKGROUND OF THE INVENTION

This invention relates to a bonding apparatus and, more particularly, to an apparatus for bonding beam-lead integrated circuits to substrates.

In the manufacture of miniaturized integrated circuits, a plurality of interconnected semiconductor components and terminals are formed on a miniature body of semiconductor material. Leads in the shape of beams are formed simultaneously to the terminals on the semiconductor body and extend in cantilever fashion therefrom to facilitate connection to external circuitry. The resulting structure is commonly referred to in the art as a beam-lead integrated circuit, or a beam-lead chip and, in order to connect the beam-leaded chip to external circuitry, the beam leads are normally attached to contact or conductive areas or pads formed on a substrate. Not only is a problem encountered in accurately aligning the microscopic beam leads of the chip with the conductive areas on the substrate, but also in reliably bonding each beam lead to its associated conductive area. To individually bond each connection is tedious, time-consuming and costly. Accordingly, various apparatus have been designed to simultaneously bond all the leads of a beam-leaded device to external circuitry in a single operation. For example, in one known apparatus, a bonding tool having a flat face is pressed against a plurality of leads to effect simultaneous bonding of the connections. While such known apparatus may constitute an advance in the economic mass production of assembling these integrated circuits, they possess certain disadvantages. Due to the miniature size of these beam-leaded integrated circuits which typically may be 40 mils square having leads extending therefrom which are 6 mils in length and 0.5 mils in thickness, it can be appreciated that minute surface irregularities and variations in the thickness of the substrate results in nonuniform bonding with such flat faced bonding tools. Excessive pressures may be applied to some leads while insufficient pressure is applied to others causing certain of the leads to be sheared or otherwise weakened with other leads being improperly bonded or not bonded at all.

SUMMARY OF THE INVENTION

Accordingly, a primary object of the present invention is to provide an improved bonding apparatus and method for uniformly bonding a plurality of leads of an integrated circuit simultaneously to their associated connections.

Another object of this invention is to provide the foregoing bonding apparatus with novel means adapted to be interposed between a bonding tool and the leads for transmitting bonding forces applied to such bonding tool to the leads.

A further object of this invention is to provide the foregoing bonding apparatus with a bonding head having a plurality of bonding tools and a crimping head driven in synchronism with the bonding head and coactive therewith to crimp the aforesaid transmitting means about the bonding tools.

Still another object of the present invention is to provide the foregoing bonding apparatus with novel workpiece alignment and positioning means.

In one aspect thereof, the bonding apparatus of this invention is characterized by the provision of a continuous strip of metal fed to a bonding head having a plurality of tools and consisting of a plurality of spaced, deformable frame members, each of which is adapted to be interposed between a bonding tool and the leads of a workpiece to transmit bonding forces applied to the bonding tool to such leads uniformly. These frame members yield and deform about the leads to evenly distribute the bonding forces about such leads and effect uniform and simultaneous bonding thereof to their substrate connections, regardless of variations in the thicknesses of or surface irregularities in the leads and the substrate. Crimping means, cooperative with the bonding tools, partially crimp the frame members thereabout prior to the bonding operation.

Various other novel features of construction and advantages inherent in the bonding apparatus construction of the present invention are pointed out in the following detailed description of a typical embodiment thereof considered in conjunction with the accompanying drawings depicting the same wherein like numerals represent like parts throughout the various views.

BRIEF DESCRIPTION OF THE DRAWINGS

FIG. 20 is a diagrammatic illustration of the electrical control system for use with the apparatus of this invention.

DETAILED DESCRIPTION OF AN ILLUSTRATIVE EMBODIMENT

Figures 1, 2, 3, 4, 5, 6, 7, 8:
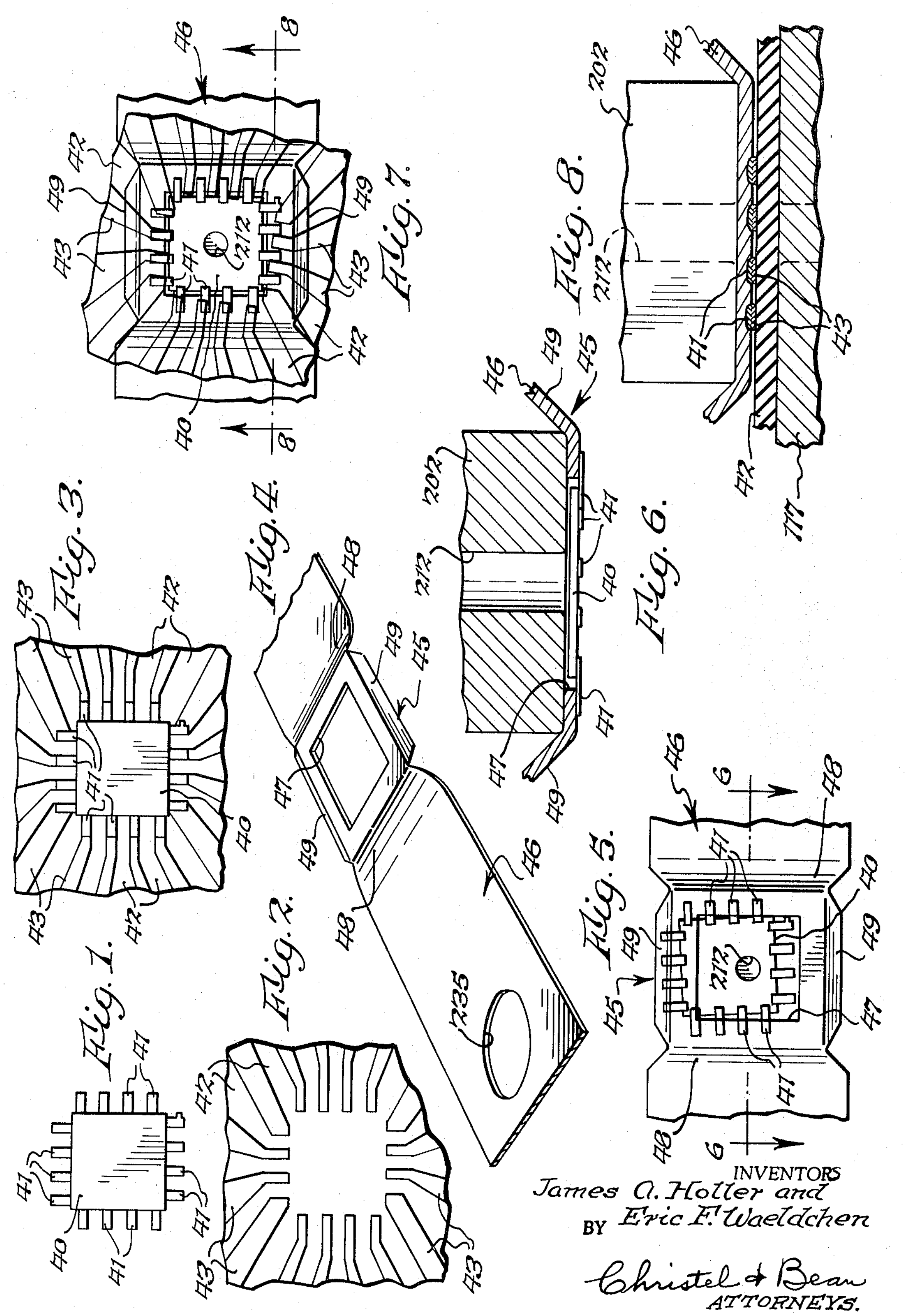
FIG. 1 is a plan view of a miniaturized integrated circuit of the beam-leaded type.
FIG. 2 is a plan view of a substrate upon which a plurality of conductive areas are formed.
FIG. 3 is a plan view of the substrate of FIG. 2 to which the leads of the beam-leaded device are bonded.
FIG. 4 is a fragmentary perspective view of a strip of material having spaced compliant members formed therein and which is used in conjunction with this invention.
FIG. 5 is an illustration of a typical view which can be seen through the microscope used in conjunction with this invention during an alignment step.
FIG. 6 is a fragmentary vertical sectional view, on an enlarged scale, of a bonding ram of this invention.
FIG. 7 is a view similar to FIG. 5 illustrating a further alignment step.
FIG. 8 is a view similar to FIG. 6, showing a bonding step.

Referring now in detail to the drawings, there is shown in FIG. 1 an illustrative integrated circuit or beam-leaded device 40, hereinafter referred to as a "chip," having a plurality of beam leads 41 extending outwardly from all sides of chip 40. Leads 41 lie in substantially the same plane and are connected at their inner ends to the active areas of chip 40. Chip 40 preferably is formed of a suitable ceramic material, such as silicon for example, and leads 41 can be composed of gold or primarily of gold with a thin layer of platinum on their upper surfaces. FIG. 2 illustrates a substrate 42, formed of a suitable ceramic material, upon which a plurality of thin conductive areas 43, composed of a suitable metallic alloy such as gold and titanium for example, are formed. Chip 40 is adapted to be positioned in the center of substrate 42 with leads 41 aligned and in contact with conductive areas 43 as shown in FIG. 3. The apparatus of the present invention, as hereinafter described, is employed to align and uniformly bond leads 41 to conductive areas 43.

In accordance with the present invention, a compliant member 45 (FIG. 4) is employed in conjunction with the bonding tool of this invention to insure substantially uniform application of bonding pressures to effect a controlled and uniform bonding of each lead 41 to its associated conductive area 43. A plurality of longitudinally spaced compliant members or frames 45 are formed in an elongated tape or strip of material 46, preferably formed of aluminum, and are each provided with an opening 47 for receiving the body of a chip 40 therein as shown in FIG. 6. Each compliant member 45 is connected to strip 46 by means of raised or offset portions 48 and is provided with inturned edge flanges 49. The formation of compliant members 45 and their function will be hereinafter described in greater detail in connection with the detailed description of the bonding apparatus of this invention.

Figures 9, 10, 11:
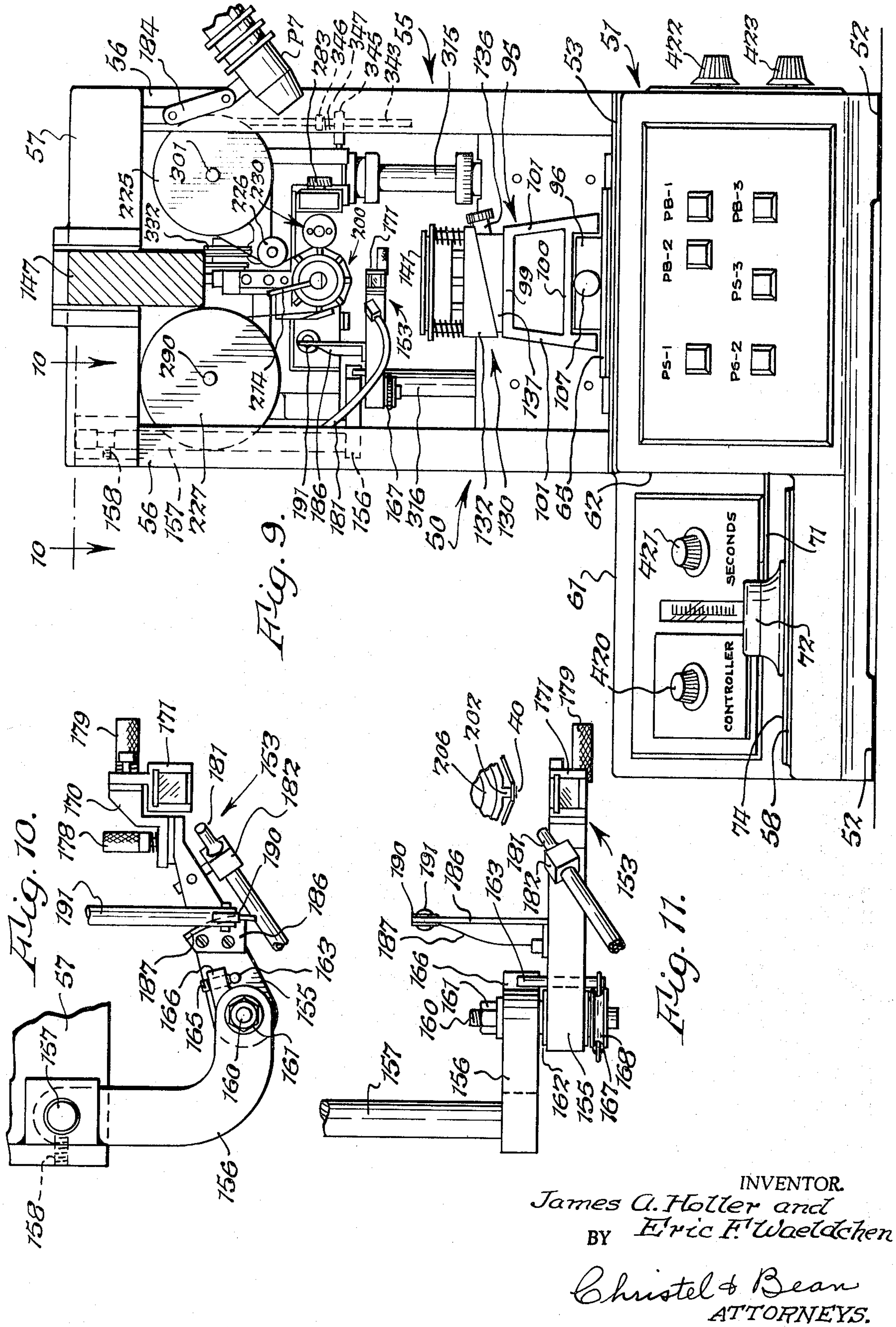
FIG. 9 is a front elevational view of the bonding apparatus of this invention.
FIG. 10 is a top plan view, on an enlarged scale, showing a portion of the optical assembly utilized in the bonding apparatus of this invention.
FIG. 11 is a front elevational view, of the optical assembly shown in FIG. 10.
Figures 12, 31:
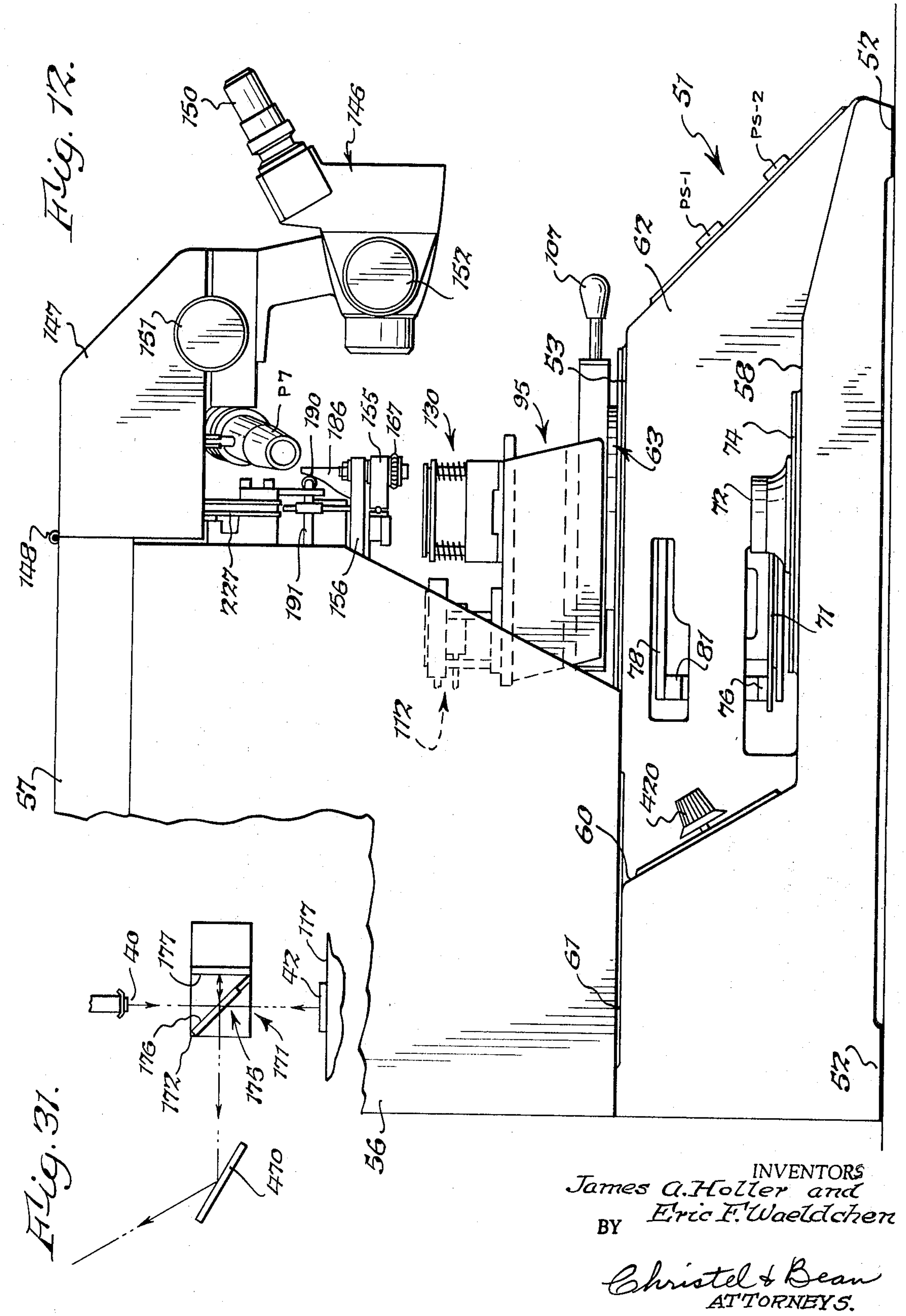
FIG. 12 is an elevational view of one side of the bonding apparatus shown in FIG. 9.
FIG. 31 is a schematic illustration of another form of optical arrangement of this invention.

Referring now to FIGS. 9–14, there is shown a bonding apparatus, generally designated 50, constructed in accordance with this invention, comprising a base 51 provided with suitable pedestals 52 adjacent the corners thereof supported on a worktable or other suitable supporting surface. The right end of base 51, as seen in FIG. 9, is provided with an upper planar portion 53 on which is carried a frame, generally designated 55, and which can be provided with side covers 56 and a top cover 57. The left end of base 51 is provided with a lower platform 58 disposed at a level substantially below portion 53. Platform 58 terminates in an inclined rear wall 60 (FIG. 12) connecting lower platform 58 to an upper platform 61 substantially flush with the upper surface of portion 53. An intermediate vertical wall 62 is provided between lower platform 58 and upper portion 53. Various control knobs, actuating buttons, and indicator lamps are mounted on base 51 and will be hereinafter described in connection with the control system for the bonding apparatus of this invention. For purposes of this description, the right side of apparatus 50 as shown in FIG. 12 will be taken to be the forward end thereof. Also, the terms top, bottom, upper, lower, and the like as used herein are referenced to FIGS. 9, 12 and 13 of the drawings for convenience of description and are not used in a limiting sense.

A carriage, generally designated 63 (FIGS. 15–18), is mounted on the upper surface of portion 53 and comprises a generally circular base plate 65 having a hub 66 depending therefrom and extending downwardly through an opening 67 in upper portion 53 of base 51. The lower face of base plate 65 is provided with an annular washer 68 bearing against a flat plate 70 provided on the upper surface of portion 53. Washer 68 and plate 70 can be formed of Teflon or some other suitable anti-friction material to facilitate relative movement therebetween.

Figures 15, 16, 17, 18:
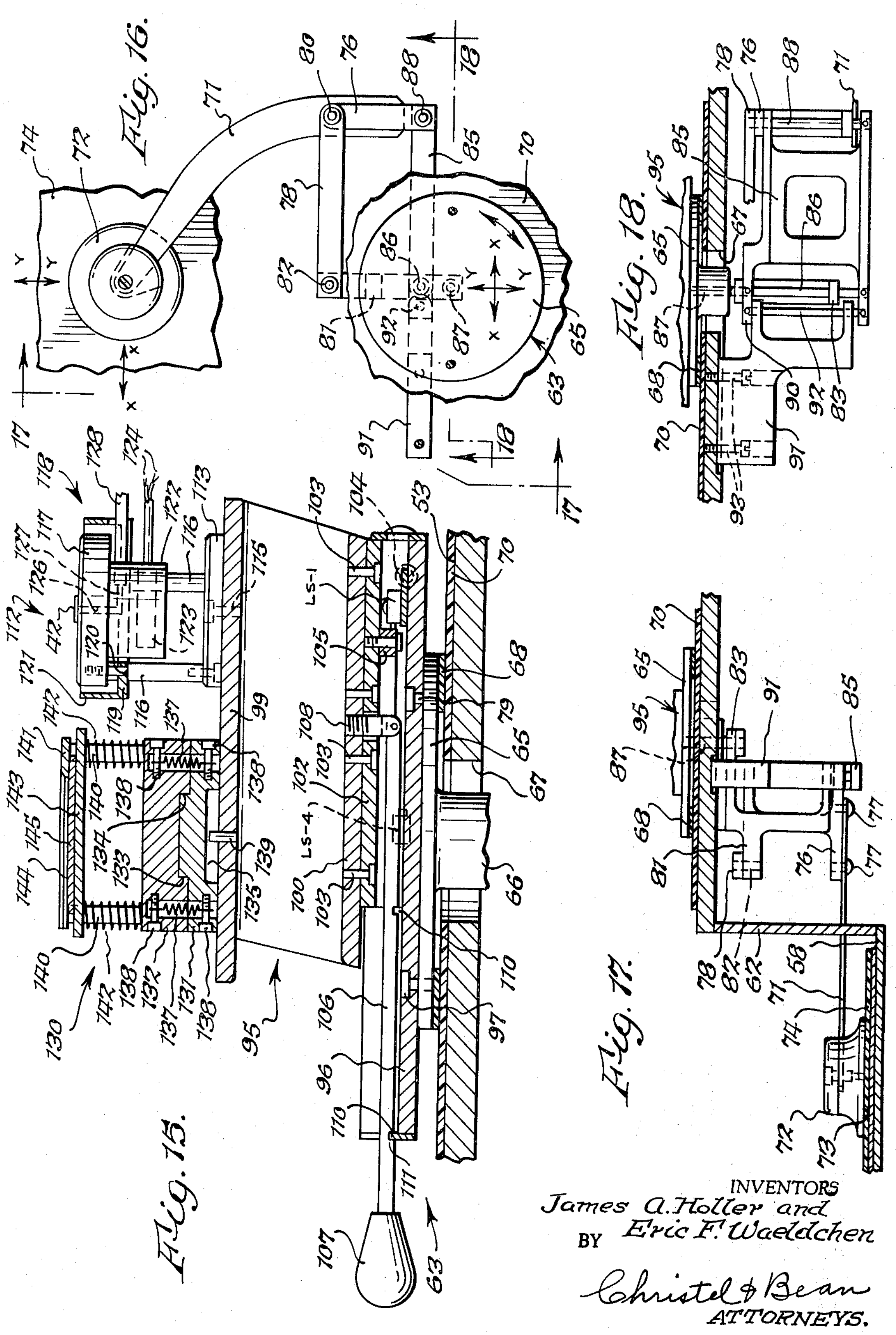
FIG. 15 is a vertical sectional view, on an enlarged scale, taken about on line 15—15 of FIG. 14.
FIG. 16 is a top plan view, with parts broken away, illustrating the carriage manipulating means utilized in this invention.
FIG. 17 is a vertical sectional view, taken about on the lines 17—17 of FIG. 16.
FIG. 18 is a vertical sectional view, taken about on the lines 18—18 of FIG. 16.

Means are provided for shifting carriage 63 in generally X and Y directions, such means including a curved arm 71 (FIG. 16) having a control knob 72 pivotally mounted on one end thereof. Knob 72 has a flat face 73 slidable on an anti-friction plate 74 supported on the upper surface of platform 58 (FIG. 17). Arm 71 extends through a suitable opening provided in intermediate wall 62 and is secured at its other end to a bracket 76 as by means of suitable fasteners 77. Bracket 76 is pivotally mounted to one end of a link 78 as at 80, the other end of link 78 being pivotally mounted to a bracket 81 as at 82. Bracket 81 has an extension 83 pivotally connected to a bracket 85 as by means of a pivot pin 86 and pivotally connected at the end thereof to a dowel pin 87 extending upwardly through hub 66 and secured to the center of carriage base plate 65. Bracket 85 also is pivotally connected at one end thereof to bracket 76 by means of a pivot pin 88 and is provided with an extension 90 pivotally mounted on a fixed bracket 91 by means of a pivot pin 92. Bracket 91 is rigidly secured to portion 53 of base 51 by suitable fasteners 93. Brackets 76, 81 and 85 together with link 78 form a parallelogram linkage within base 51 operable by means of arm 71 and control knob 72 to effect movement of carriage 63 in X and Y directions. The parallelogram arrangement is designed to transmit a 10-to-1 ratio of movement from control knob 72 to carriage 63 for providing a very sensitive movement of the latter when aligning the workpieces as will presently be described. It should be noted that movement of knob 72 in the Y—Y direction effects displacement of carriage 63 in the same direction a distance one-tenth of the distance that knob 72 is moved. However, when knob 72 is moved in the X—X direction, carriage 63 moves in the opposite direction a distance one-tenth the distance that knob 72 has been displaced. The opposite movement transmitted to carriage 63 in the X—X direction is due to the location of the carriage construction 87 to the manipulating linkage at a point below the pivot axis 86 of the parallelogram linkage and is intended to compensate for the reverse image of one of the workpieces observed through the microscope during the workpiece alignment operation.

A slide, generally designated 95, mounted on guide block 96, is rigidly fixed to carriage 63 by fasteners 97. Slide 95 is formed of a unitary, one-peice construction comprising a top wall 99, a bottom wall 100 and a pair of side walls 101 forming a generally, hollow, box-like construction. Side walls 101 extend downwardly below bottom wall 100 (FIG. 9) straddling guide block 96. A slide plate 102 is mounted on the underside of bottom wall 100 by fasteners 103 and is guided within suitable ways (not shown) in guide block 96. A cam actuator 105 is carried by plate 102 and is engagable with a limit switch LS-1 mounted on guide block 96. A limit switch LS-4 also is mounted along the side of guide block 96 and is engagable by a tapered set screw 104 threaded into the lower depending portion of one of the side walls 101 of slide 95 when the latter is shifted to an alternate position. The function of switches LS-1 and LS-4 will be explained in connection with the electrical control system for the apparatus of this invention.

A shift lever 106 having a control knob 107 at one end thereof is connected at its other end to the lower end of a vertically extending stud 108 threaded into bottom wall 100. Thus, slide 95 can be shifted axially by lever 106 relative to guide block 96 to locate the workpieces in alternate positions for the various operations hereinafter described. A pair of longitudinally spaced notches 110 are provided in lever 106 for engagement with an upstanding detent 111 mounted at the forward end of guide block 96 to secure slide 95 in either of its two alternate work positions. Also, lever 106 can be moved laterally to effect rotation of carriage 63 about its pivot axis defined by pin 87.

Rigidly secured to the upper surface of slide top wall 99 is a workholder or substrate holder assembly, generally designated 112 (FIG. 15), comprising a base 113 attached to wall 99 by a suitable fastener 115 and a plurality of upstanding posts 116 extending upwardly from base 113. A circular workholding table 117 is mounted on the upper ends of posts 116 in spaced relation to an insulating member 118 having a flat body 119 carried on annular shoulders 120 of posts 116 and a rim 121 radially spaced from the peripheral edge of table 117. A block 122 extends downwardly from the lower face of table 117 for receiving an electrical heating element 123 in the form of a removable cartridge connected to a suitable power source (not shown) by means of conductors 124. A passage 126 is provided centrally through table 117 and is connected to a passage 127 formed in block 122 and connected by means of a conduit 128 to a source of vacuum (not shown). A substrate 42 is adapted to be placed on the upper flat surface of table 117 and held in the proper orientation by means of a vacuum force applied through passages 126, 127 and conduit 128.

Also carried on slide 95 is a worktable or removable chip holder assembly, generally designated 130, comprising a lower wedge member 131 (FIG. 9) forming the base of the assembly and an upper wedge member 132 slidable relative to lower wedge member 131. The abutting surfaces of wedge members 131 and 132 are provided with complementary, parallel guideways 133 and 134 as shown in FIG. 15. An adjusting screw 136 (FIG. 9) is mounted in wedge member 131 and is threaded into a nut (not shown) affixed to wedge member 132 for effecting relative sliding movement therebetween and raising or lowering upper wedge member 132 as desired. Wedge members 131 and 132 are urged together by means of helical extension springs 137 attached at their opposite ends to laterally extending studs 138 mounted in wedge members 131 and 132, respectively. A plurality of posts 140 extend upwardly from the upper surface of wedge member 132 adjacent the corners thereof and are rigidly secured at their upper ends to a dish frame 141 having a generally U-shaped configuration in plan. Compression springs 142 are disposed about posts 140 for yieldingly supporting a platform 143 disposed below dish frame 141. A removable plate or tray 145 is interposed between frame 141 and platform 143 and has an upper surface 144 exposed through U-shaped frame 141 for holding a plurality of chips 40 thereon. Because of the miniature size of these chips 40, they are lightly adhesively secured to tray 145 to prevent displacement and/or loss of chips 40 in handling. The bottom of wedge member 131 is provided with a generally square undercut 135 for permitting movement of chip holder assembly 130 in horizontal directions as limited by an upstanding pin 139 secured to top wall 99 of slide 95.

Figure 13:
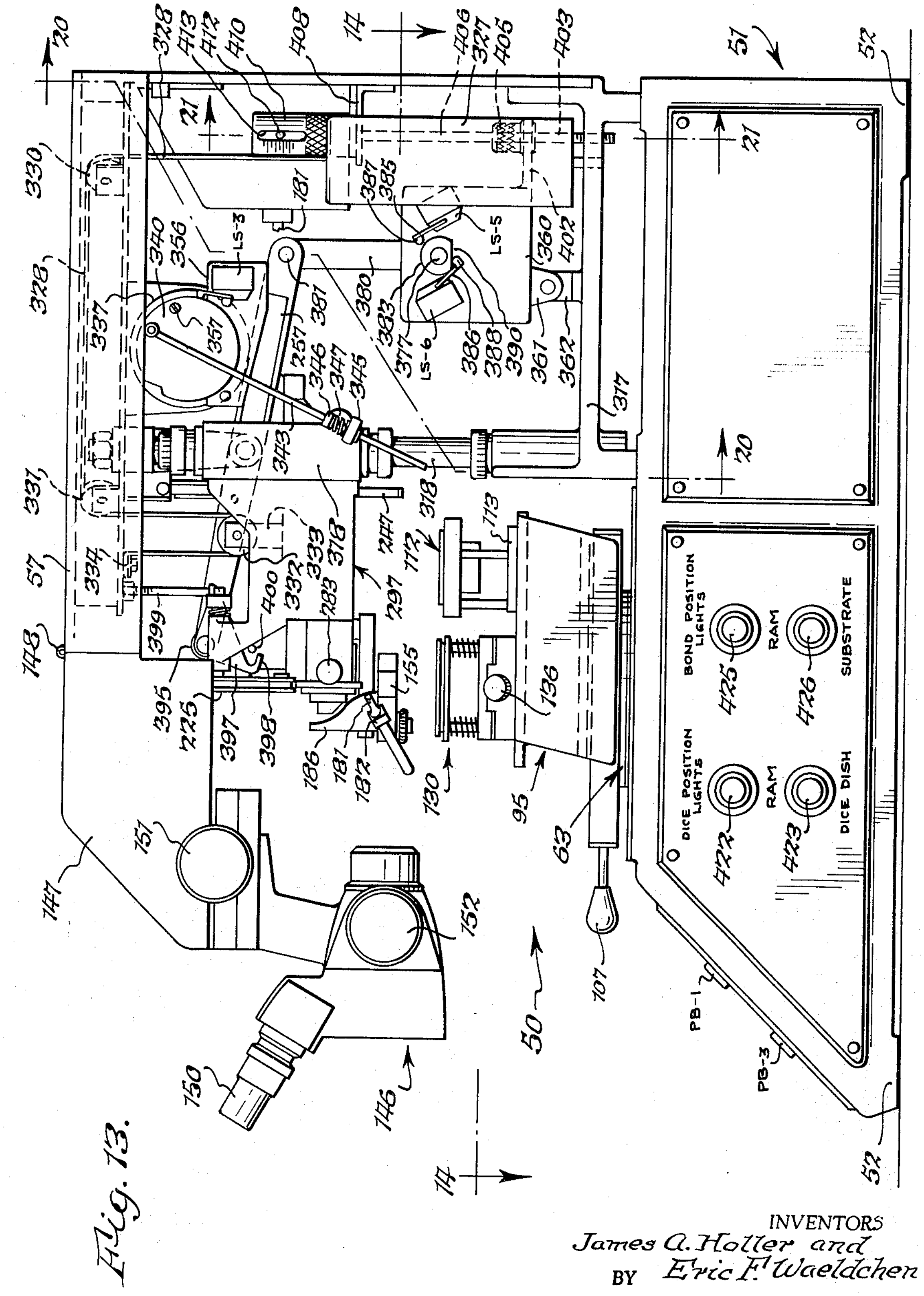
FIG. 13 is an elevational view of the other side of the bonding apparatus of FIG. 9.
Figure 14:
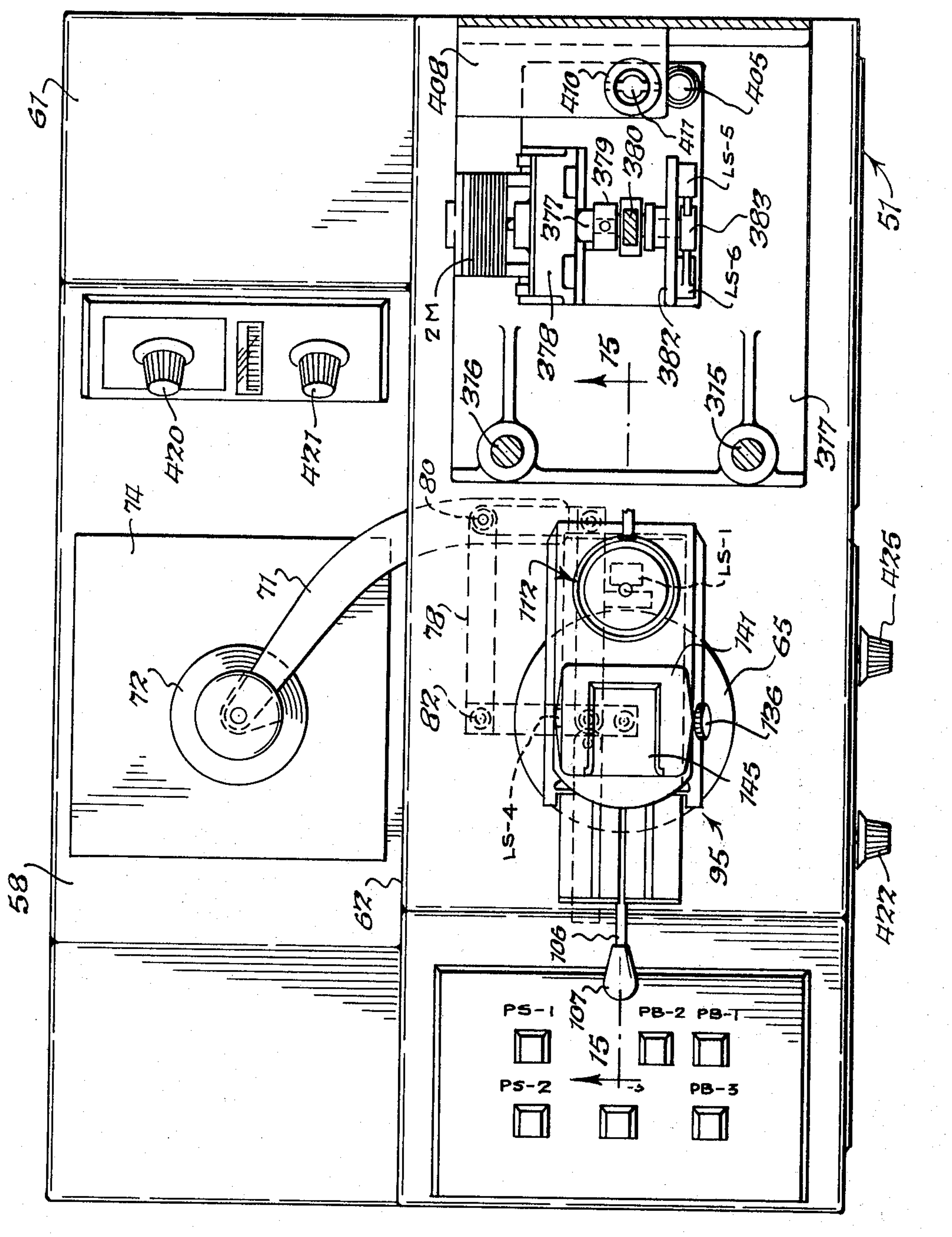
FIG. 14 is a horizontal sectional view taken about on the lines 14—14 of FIG. 13.

In order to align chip 40 with opening 47 of compliant member 45 prior to the chip pick-up operation and subsequently align beam leads 41 of chip 40 with the conductive areas 43 on substrate 42 for the bonding operation, an optical arrangement is provided and includes a microscope assembly 146 mounted on a support 147 pivotally mounted on top cover 57 by means of a hinge 148 (FIGS. 12 and 13). When not in use, microscope assembly 146 can be swung out of the way about hinge 148 and rested on top cover 57. Microscope assembly 146 includes the usual eyepieces 150, an optical element or lens (not shown), and suitable adjusting means 151 and 152 for orienting the microscope in the proper direction and focusing the lens on the intended objects.

The optical arrangement also includes a beam splitter and light source assembly, generally designated 153 (FIGS. 9–11), carried by a support arm 155 pivotally mounted on a support bracket 156, in turn mounted on a vertically extending shaft 157 (FIG. 9) journalled in frame 55 and fixed against rotation by a set screw 158. The means for pivotally supporting arm 155 on bracket 156 includes a shaft 160 projecting through bracket 156 and rigidly secured thereto by means of a nut 161. One end of arm 155 is pivotally journalled about shaft 160 by a suitable bearing 162 and is provided with a vertically extending pin 163 engagable with a stop in the form of a set screw 165 adjustably threaded in a lug 166 projecting from bracket 156. The lower end of pin 163 is secured to a spring 167 disposed about and secured at its other end to a pulley 168 mounted on shaft 160. Spring 167 urges arm 155 into a workpiece viewing position or the position shown in FIG. 10 as limited by the engagement of pin 163 with stop 165.

The other end of arm 155 carries a bracket 170 to which is attached a housing 171 having a vertical passage 172 (FIG. 19) and a horizontal passage 173 intersecting passage 172 at right angles. A beam-splitter 175 is mounted within housing 171 at the intersection of passages 172 and 173 and is provided with a semi-reflective surface 176 inclined at a 45° angle with respect to both passages 172 and 173. Beam splitter 175 reflects a certain percentage of the light passing through each of the passages and transmits a certain percentage therethrough while the remaining light is lost through absorption. A silver surfaced mirror 177 is disposed in housing 171 at an angle of 45° relative to reflective surface 176. Suitable micrometer adjustments 178 and 179 are provided on bracket 170 for finely adjusting the angular disposition of beam splitter 175, it being understood that the latter can be bodily adjusted about shaft 157 by loosening and resetting set screw 158.

It should be understood that the optical arrangement utilized in this invention is adapted to align two workpieces in various stages of operation, which workpieces are spaced apart 180°. In order to provide adequate lighting to better illuminate the workpieces to be viewed, light from a suitable source, such as a lamp P6, mounted at the rear of frame 55 (FIG. 20), is transmitted through a fiber optic light cord 181, held in an adaptor 182 carried by arm 155, and directed onto the bonding tool, hereinafter described and which carries complient member 45 and chip 40. Also, a source of light, such as a spot lamp P7 (FIG. 9) is provided for directing light on chip holder assembly 130 or substrate holder assembly 112, dependent on the position of slide 95. Spot lamp P7 is adjustably mounted to frame 55 by means of a linkage arrangement 184.

Figures 19, 20, 21, 22, 23:
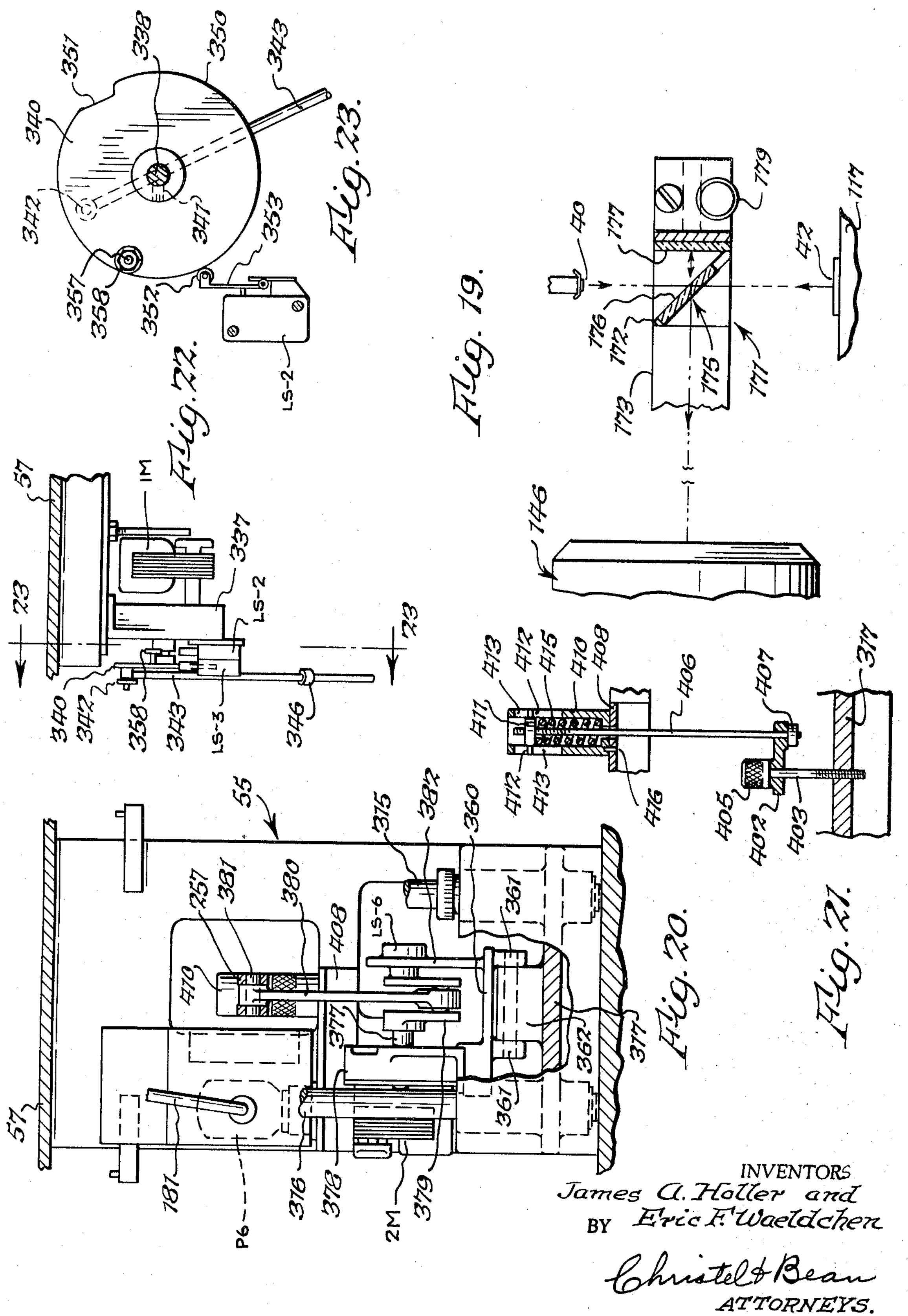
FIG. 19 is a schematic illustration of the optical arrangement of this invention.
FIG. 20 is a rear elevational view, partially in section and partly broken away, illustrating the pressure crank assembly utilized in the present invention.
FIG. 21 is a fragmentary vertical sectional view, taken about on lines 21—21 of FIG. 13.
FIG. 22 is a fragmentary, rear elevational view, illustrating a second crank drive arrangement employed in the present invention.
FIG. 23 is a fragmentary side elevational view, on an enlarged scale, of the crank drive arrangement shown in FIG. 22.

FIG. 19 illustrates the manner in which chip 40 is aligned with substrate 42 prior to the bonding operation. Light reflected from substrate 42 strikes the reflective surface 176 of beam splitter 175 and is reflected 90° into the objective lens of the microscope assembly 146. Light from chip 40 is reflected 90° by beam splitter 175 to the silver surface of mirror 177 and is reflected directly back on the same beam, a portion of which passes through beam splitter 175 to the objective lens of microscope assembly 146 creating superimposed images of chip 40 and substrate 42. However, the image of substrate 42 observed by the eye of the operator is oriented 180° from the true image thereof and is compensated for in the alignment of these superimposed images by means of the movement of carriage 63 in an opposite direction from that of knob 72 when displaced in an X—X direction.

Also carried by arm 155 is a cam segment 186 having a cam surface 187 adapted to be engaged by a cam follower roller 190 suitably journalled at one end of a horizontally extending rod 191 movable in a downwardly direction along with the tool block, hereinafter described, to swing arm 155 out of the way about the pivot axis defined by shaft 160 just prior to the bonding operation.

Since the beam from chip 40 must pass through beam splitter 175 twice and accordingly lose double the amount of light, producing a less intense image to the eye of the operator, two or more fiber optic light cords 181 can be provided, as desired, to compensate for such loss of light.

Figures 24, 25, 26:
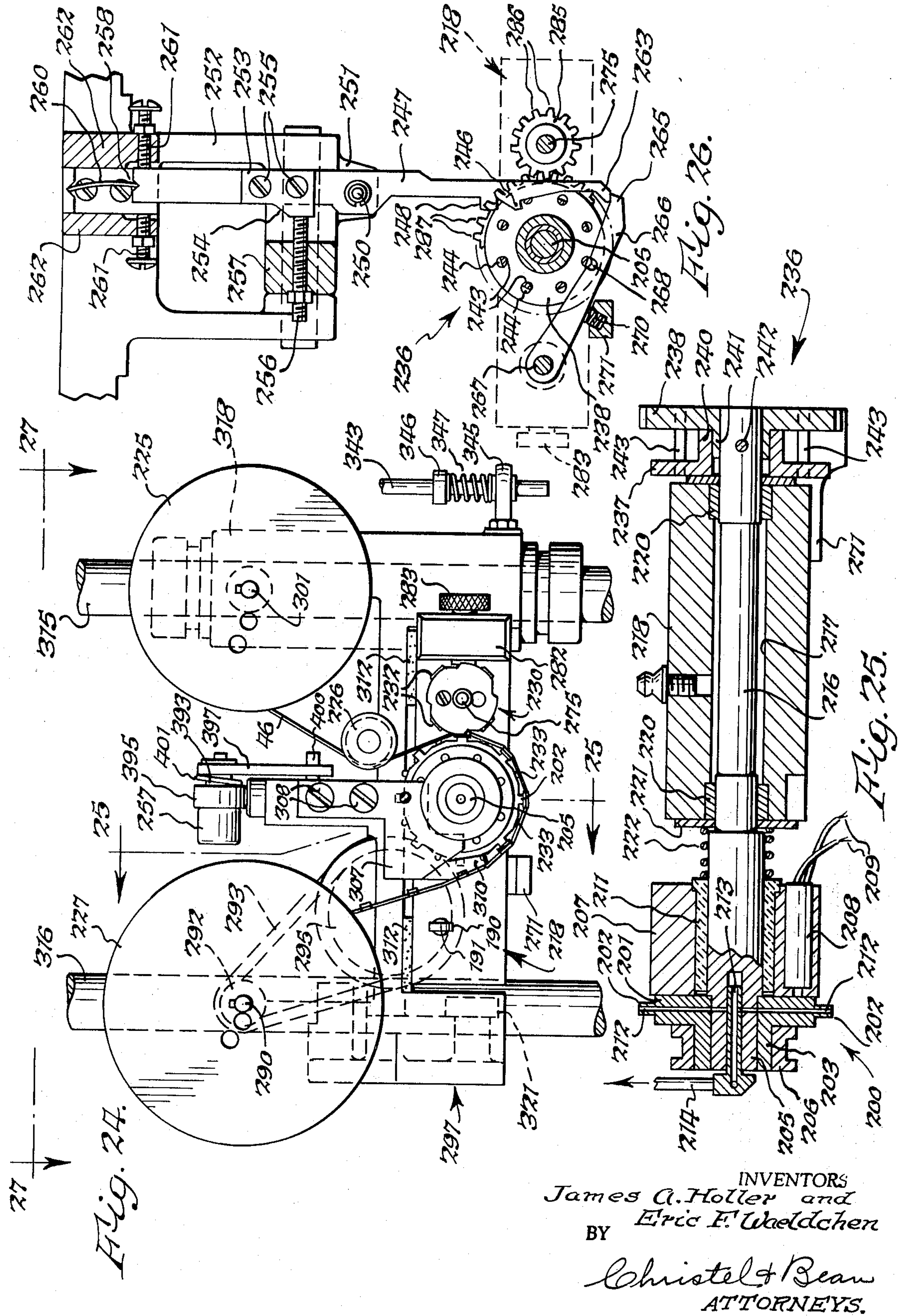
FIG. 24 is a fragmentary front elevational view, on an enlarged scale, illustrating the bonding head and compliant tape feed arrangement of this invention.
FIG. 25 is a vertical sectional view, on an enlarged scale, taken about on lines 25—25 of FIG. 24.
FIG. 26 is a vertical sectional view, illustrating the drive mechanism for indexing the bonding head of this invention.

In accordance with the present invention, the bonding apparatus includes a rotatable bonding tool, generally designated 200 (FIGS. 25, 26 and 29), having a generally circular head 201 provided with a series of circumferentially spaced bonding rams 202 projecting radially outwardly from head 201. Head 201 is provided with a hub 203 mounted on one end of a rotatable shaft 205, the circular portion of head 201 being sandwiched between an outer sleeve 206 and a thermal head 207. Four heating elements 208 (only one of which is shown in FIG. 25) in the form of removable cartridges are mounted in head 207 for providing the necessary heat required to effect bonding and are connected to a suitable source of electrical power as by means of conductor leads 209. An insulating sleeve 211 is interposed between thermal head 207 and shaft 205 to preclude undesirable heating of the latter. As shown in FIG. 25, each bonding ram 202 is provided with a central passage 212 leading to the face of such ram 202 and connected at its inner end to an axial passage 213 connected to a conduit 214 leading to a suitable source of vacuum (not shown). Thus, a suction force is applied to each bonding ram 202 to hold a chip 40 thereon and retain the same in the proper orientation.

Shaft 205 is provided with a reduced diameter portion 216 extending through a bore 217 provided in a tool block 218 and journalled for rotation therein by means of spaced bearings 220. A washer 221 is mounted on reduced diameter portion 216 of shaft 205 against the face of block 218 and serves as an abutment for a compression spring 222 disposed about shaft 205 between such washer 221 and sleeve 211. Spring 222 urges thermal head 207 against bonding head 201 to insure adequate heating of the latter. A pair of pins 223 (FIG. 29) projecting forwardly of tool block 218 are received in suitable bores provided in thermal head 207 to prevent rotation thereof relative to bonding head 201.

An important feature of this invention resides in the use of a compliant member 45 to apply equal bonding pressures to the workpieces and insure uniform bonding of each chip lead 41 to its associated substrate conductive area 43. As earlier mentioned, these compliant members 45 are conveniently provided in an elongated tape or strip of material 46, which tape is trained about bonding head 201 and indexed thereby through an indexing drive mechanism hereinafter described. As best shown in FIG. 24, the compliant tape 46 is supplied from a payoff reel 225 and is trained about an idler pulley 226, bonding head 201, and ultimately fed to a take-up reel 227. Tape 46 is fed between bonding head 201 and a disc-like crimping head, generally designated 230, having a groove 231 (FIG. 29) for receiving tape 46 and a plurality of laterally spaced pairs of crimping elements 232 circumferentially spaced about head 230 and adapted to register with bonding rams 202 during synchronous rotation of heads 201 and 230. Each ram 202 serves as an anvil about which portions of compliant members 45 are bent by means of a rolling action between crimping elements 232 and rams 202 to form offset neck portions 48 (FIG. 4) and flanges 49 which extend about the sides of rams 202 adacent the end faces thereof to facilitate proper positioning of compliant members 45 on rams 202. The offset neck portions 48 provide a clearance on opposite sides of ram 202 to enable the latter to be lowered into engaging position against a single, selected chip 40 without interference or engagement of tape 46 with any of the other chips 40 closely spaced on workholding tray 145. Bonding head 201 is provided with a plurality of circumferentially spaced pins 233 adapted to be inserted in spaced openings 235 for advancing tape 46 therealong.

The means for indexing bonding head 201 includes a pin wheel assembly 236 comprised of spaced disc members 237 and 238 having hub portions 240 and 241 keyed to each other and to the rear end of shaft 205 by means of a dowel pin 242. A plurality of studs 243 having flattened surfaces 244 are secured at their opposite ends in members 237 and 238 and are arranged in a circular array circumferentially spaced from each other as shown in FIG. 26. These studs 243 are adapted to be consecutively engaged by a detent 246 formed on an indexing lever 247 for indexing shaft 205 through predetermined arcuate movements. As shown in FIG. 26, lever 247 also comprises a second detent 248 spaced above detent 246 and adapted to be engaged by a stud 243 for shifting lever 247 out of the way into its alternate position.

Lever 247 is pivotally mounted intermediate its opposite ends on a pivot pin 250 carried by a lug 251 on a stationary bracket 252 mounted on frame 55. A cam element 253 having a cam surface 254 is mounted on lever 247 by suitable fasteners 255 and is adapted to be engaged by an adjustable screw 256 carried by a movable pressure arm 257. The upper end of lever arm 247 is provided with a V-shaped notch 258 for receiving one end of a spring 260 of the over-center type for maintaining lever 247 in one or the other of its alternate positions. As shown in FIG. 26, spring 260 urges the upper end of lever 247 to the right. However, if a force greater than the spring force is applied to move the upper end of lever 247 past center, spring 260 then is effective to urge the upper end of lever 247 to the left and maintain the upper end of lever 247 in such position. Pivotable movement of lever 247 in either of its alternate positions is limited by adjustable stop screws 261 mounted in brackets 262 supported by frame 55. An offset cam portion 263 is formed on the bottom end of lever 247 and is engagable with the distal end 265 of a locking lever 266 pivotally mounted on tool block 218 as at 267. Locking lever 266 is provided with a notch 268 normally engagable about one of the studs 243 under the influence of a compression spring 270 mounted in an extension 271 formed on tool block 218 for preventing rotation of shaft 205 and thereby bonding head 201.

As will presently appear, tool block 218 is mounted for vertical reciprocable movement to lower and raise bonding head 201. FIG. 26 illustrates tool block 218 in a position during its upward movement just after the bonding operation. As tool block 218 moves upwardly relative to lever 247 which is fixed against axial movement, the engagement of indexing lever cam portion 263 with locking lever distal end 265 causes the stud 243 oriented at approximately the 7 o'clock position to disengage from notch 268 to free pin wheel assembly 236 for rotation. As tool block 218 moves upwardly further, the stud 243 at approximately the 2 o'clock position engages stationary detent 246 to effect clockwise movement of pin wheel assembly 236 thereby indexing bonding head 201. As assembly 236 rotates, the stud 243 at approximately the 1 o'clock position moves in an arcuate path against detent 248 to swing the lower end of lever 247 to the right as viewed in FIG. 26 and out of the way of the upwardly moving studs 243. Pressure arm 257 moves upwardly with tool block 218 so that screw 256 is displaced from the high portion of cam 253 allowing lever 247 to pivot as described above. As lever 247 is pivoted out of the way, locking lever 266 is free to swing upwardly to receive the next stud 243 in notch 268 whereby pin wheel assembly 236 and bonding head 201 are locked in their newly indexed position until the subsequent bonding operation. When tool block 218 and pressure arm 257 are again lowered for the next bonding operation, screw 256 is effective to swing indexing lever into the opposite position shown in FIG. 26.

Crimping head 230 is mounted on a shaft 275 extending through tool block 218 and journalled at one end in a self-aligned bearing 276, the other end of shaft 275 being journalled for rotation in a bearing 277 mounted in a collar 278 having a threaded stud 280. Stud 280 is threaded into a body 281 threaded in an extension 282 of tool block 218. Stud 280 and body 281 are provided with different pitch sizes so as to provide a venier-type adjustment when knob 283 is rotated to adjust crimping head 230 toward or away from bonding head 201, as desired.

A gear 285 is mounted on the rear end of shaft 275 and is provided with peripheral teeth 286 meshing with gear teeth 287 provided on disc member 238 of pin wheel assembly 236. Thus, bonding head 201 and crimping head 230 are synchronously rotated in opposite directions upon indexing movement of pin wheel assembly 236. The apparatus thus far described indexes bonding head 201 and crimping head 230 to continuously supply compliant members 45 in strip form to rams 202 and to crimp such compliant members 45 into the desired configuration about rams 202 in readiness for the chip pick-up operation.

Figures 27, 28, 29:
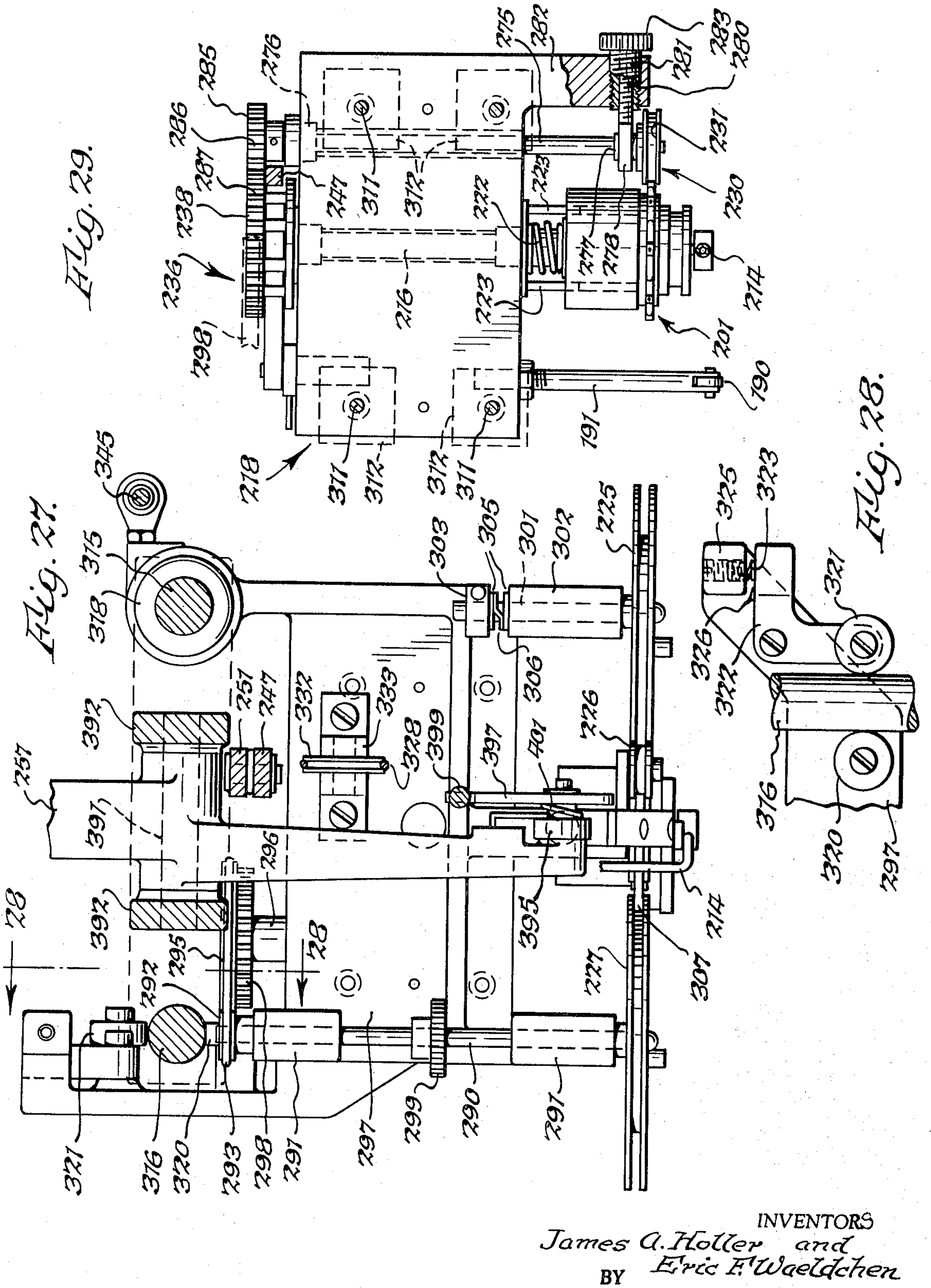
FIG. 27 is a horizontal sectional view, taken about on the lines 27—27 of FIG. 24.
FIG. 28 is a fragmentary elevational view looking in the direction of arrows 28—28 in FIG. 27.
FIG. 29 is a top plan view of the tool block for mounting the bonding head and the compliant crimping head of this invention.

Means are provided to receive tape 46 and the spent compliant members 45 as the latter are indexed by head 201. To this end, take-up reel 227 is mounted on a rotatable shaft 290 (FIG. 27) journalled for rotation in spaced sleeve bearings 291. The rear end of shaft 290 carries a pulley 292 for receiving an endless drive belt 293 also trained about a pulley 295 mounted on a rotatable shaft 296 journalled in a reciprocable carriage 297, hereafter more fully described. Shaft 296 also carries a gear 298 meshing with gear teeth 287 of disc member 238 (FIG. 29). Thus, as disc member 238 is indexed through a predetermined angular movement by the indexing mechanism earlier described, gear 298 also turns a proportionate amount to effect rotation of take-up reel 227 through the pulley and belt arrangement to wind tape 46 thereon. A rotatable hand knob 229 is secured to shaft 290 to enable reel 227 to be manually rotated. Pay off reel 225 is mounted on a shaft 301 journalled for rotation in a sleeve bearing 302 carried by carriage 297. A collar 303 is mounted on the rear end of shaft 301. Spaced washers 305 are mounted on shaft 301 between collar 303 and sleeve bearing 302 with a resilient, angularly bent washer 306 interposed between washers 305 to provide a small amount of tension on shaft 301 preventing slack in tape 46 between reel 225 and pulley 226.

Referring to FIG. 24, an adaptor plate 307 is mounted on carriage 297 by means of fasteners 308 and is provided with a stripper element 310 depending downwardly therefrom between bonding head 201 and tape 46 to strip the spent compliant members 45 from rams 202 as bonding head 201 is indexed. Tool block 218 is mounted on carriage 297 by means of fasteners 311 (FIG. 29) projecting upwardly from tool block 218 and suitably secured to carriage 297. Insulating pads 312 are sandwiched between the upper, generally flat surface of tool block 218 (FIG. 24) and the lower, intermediate portion of carriage 297. Tool block 218, carrying bonding head 201 and crimping head 230, together with the compliant tape feeding arrangement, are mounted on carriage 297 for reciprocable movment therewith.

Carriage 297 is guided for vertical movement on upright guideposts 315 and 316 suitably fixed at their lower ends to a bed plate 317 mounted on base 51. Carriage 297 is provided with a guide bushing 318 encircling guidepost 315 and a pair of rollers 320 and 321 engagable with post 316 for facilitating sliding movement thereon. Roller 320 is rotatably mounted on carriage 297 and roller 321 is journalled for rotation on one end of a pivotal bellcrank 322 (FIG. 28). A compression spring 323 mounted in a spring holder 325 on carriage 297 abuts against an abutment surface 326 on the other end of bellcrank 322 to resiliently urge roller 321 against guidepost 316. As best shown in FIG. 13, a counterweight arrangement is employed to hold carriage 297 in the selected vertical position and includes a counterweight 327 mounted on a cable 328 guided about pulleys 330 and 331 suitably mounted adjacent the top of frame 55, a pulley 332 mounted in a bracket 333 secured to a carriage 297 and fixedly secured to the top of frame 55 as at 334. While power means are provided for reciprocating carriage 297, the latter can be raised and lowered on guideposts 315 and 316 manually by hand, if desired.

Power means are provided for reciporcating carriage 297 for the chip pick-up operation and for the bonding operation, respectively. The first of these means comprises an electric motor 1M (FIG. 22) mounted on a bracket 336 adjacent the top of frame 55 and connected through suitable drive reduction means 337 to an output shaft 338 (FIG. 23). A crank disk 340 is rigidly secured to shaft 338 as by a set screw 341 and is provided with fastening means 342 for securing one end of a crank rod 343 thereto. As shown in FIGS. 13 and 27, crank rod 343 extends through a rod end bearing 345 connected to carriage 297. A collar 346 is fixedly attached to rod 343 and a compression spring 347 is disposed about rod 343 between collar 346 and rod end bearing 345. It will be readily apparent that rotational movement imparted to disk 340 by motor 1M effects substantially axial movement of rod 343 to vertically reciprocate carriage 297 on guideposts 215 and 216.

Crank 340 is provided with a peripheral cam surface 350 having a retreating portion 351 engagable by a cam follower in the form of a roller 352. Roller 352 is secured to a pivotal lever 353 for actuating a limit switch LS-3 mounted on a bracket 356 (FIG. 13) connected to the housing for gear reduction means 337. Crank 340 also is provided with a threaded stud 357 for receiving a nut 358 adapted to engage and actuate a limit switch LS-2 also mounted on bracket 356. The purpose of limit switches LS-2 and LS-3 will be explained in connection with the electrical control system diagrammatically illustrated in FIG. 30.

The second power means for reciprocating carriage 297 includes a motor 2M (FIG. 20) mounted on a support plate 360 having a pair of dependent lugs 361 pivotally connected to a lug 362 mounted on bed plate 317. Motor 2M is connected to a crankshaft 377 through a suitable gear reduction means 378 and is provided with a crank 379. A crank rod 380 is connected at one end to crank 379 and the other end is pivotally connected to pressure arm 257 as by means of a pivot pin 381. Crankshaft 377 projects through a vertically extending plate 382 and has a cam 383 secured thereto. A pair of limit switches LS-5 and LS-6 are mounted on plate 382 and are provided with pivotal actuating levers 385 and 386 carrrying cam follower rollers 387 and 388 thereon urged against the peripheral surface of cam 383. As shown in FIG. 13, cam 383 has a flattened portion 390 for effecting pivotal movement of levers 385 and 386 to actuate switches LS-5 and LS-6 for a purpose hereinafter explained.

Pressure arm 257 is pivotally mounted intermediate its opposite ends on a pivot pin 391 (FIG. 27) mounted in spaced lugs 392 carried by frame 55. The other or forward end of pressure arm 257 is provided with a shaft 393 on which is mounted a roller 395 bearing against the upper end of an embossment 396 mounted on carriage 297. Thus, downward movement of the forward end of pressure arm 257 forces roller 395 against embossment 396 to move carriage 297 downwardly. In order to lift carriage 297, roller shaft 393 also carries a pivotal bellcrank 397 having a hook 398 at one end thereof (FIG. 13) engagable about a pin 400 projecting laterally outwardly from carriage 297. Hook 398 is normally biased into engagement with pin 400 by means of a torsion spring 401 (FIGS. 24 and 27) mounted on shaft 393 between roller 395 and bellcrank 397 for lifting carriage 297 upon upward movement of the forward end of pressure arm 257. When arm 257 is moved to its uppermost position, the other end of bellcrank 397 engages a vertically extending rod 399 mounted on the upper end of frame 55 to pivot bellcrank 397 and unlatch hook 398 from about pin 400 as shown in FIG. 13. In this condition, carriage 297 can be moved by hand or by crank rod 343 as earlier described.

Means are provided for regulating the pressure applied to the workpieces by rams 202 through the crank drive mechanism described above, such means including an extension 402 extending horizontally from support plate 360 and having an opening therein for receiving a bolt 403 therethrough threadably mounted in bed plate 317. Bolt 403 is provided with a knob 405 for manually threading bolt 403 in bed plate 317 to vary the height of plate 360 from bed plate 317. A rod 406 is secured to extension 402 by a nut 407 and extends upwardly through a support bracket 408 and into a housing 410 carried by bracket 408. The upper end of rod 406 is threaded to receive a nut 411 having laterally extending pins 412 projecting through diametrically opposed slots 413 in housing 410. A compression spring 415 is mounted about rod 406 between nut 411 and the bottom wall of housing 410 to urge rod 367 and thereby plate 360 upwardly. A pin 416 mounted on bracket 408 is received in a suitable aperture in the wall of housing 10 to prevent rotation of the latter. In order to adjust the tension of spring 415, housing 10 is raised to disengage pin 416 and then rotated to thread nut 411 on rod 406 to compress or relax spring 415. Thus, the pressure applied to the workpieces during the bonding thereof is regulated by adjusting the tension on spring 415. The outer surface of housing 410 is provided with indicia adjacent one of the slots 413 to visually indicate the pressure applied to facilitate the adjustment thereof.

The electrical control system, illustrated diagrammatically in FIG. 30 will be described in terms of its function in conjunction with the operation of the apparatus of this invention. The various control knobs, push button actuators, and indicator lamps are mounted on base 51. As shown in FIG. 9, a temperature control knob 420 and a bonding time cycle control knob 421 are mounted on inclined wall 60 of base 51. Power switch buttons PS-1, PS-2 and PS-3 and push buttons PB-1, PB-2 and PB-3 are mounted on the front face of base 51. Buttons PS-1, PS-2, PS-3, PB-1, PB-2 and PB-3 are formed of a suitable translucent or transparent material and house indicator lamps P1 through P5 and P8, respectively. Knobs 422 and 423 are mounted on the side of base 51, as shown in FIG. 13, and control the illumination intensity of lamps P6 and P7 for the chip pick-up operation and knobs 425 and 426, also mounted on the side of base 51, control the illumination intensity of lamps P6 and P7 for the bonding operation. Switch PS-3 is an on-off switch incorporated in the circuitry of lamps P6 and P7 for turning such lamps on or off without the necessity of disturbing the settings of knobs 425 and 426.

Prior to operation, control knobs 420 and 421 are manipulated to set the desired bonding temperature and time cycle. The tension of spring 415 is adjusted by means of housing 410 and nut 411 to set the pressure desired. Knobs 422, 423, 425, and 426 are rotated to establish the desired intensity of illumination for the pick-up and bonding operations. It will be assumed that carriage 397 is in its uppermost position illustrated in FIG. 13 with crank disk 340 at the 0° position of its cycle whereby limit switch LS-2 is closed and LS-3 is opened. Also, crank 379 is at the 0° position of its cycle with limit switch LS-5 held in one of its alternate positions and limit switch LS-6 held in an opened position. Assume also that slide 95 is in its forwardmost position away from the rear of the apparatus whereby substrate assembly 112 is disposed beneath the optical system. Hereinafter, such position will be referred to as the bonding position and the alternate position of slide 95, whereby the chip holder assembly 130 is positioned beneath the optical system as shown in FIG. 13, will be referred to as the chip pick-up position.

In operation, power switch PS-1 is depressed (FIG. 30) and maintained closed to supply operating current from a suitable source (not shown) through a power line comprising conductors 427 and 428. An indicator lamp P-1 in lead 428 is illuminated to indicate that power for the electrical control system is on. Power switch button PS-3 is then depressed and maintained closed so that current is supplied via leads 427 and 428, potentiometers 430 and 431 which had previously been set by control knobs 422 and 423, through normally closed contacts LR-1 and LR-3 to lamps P6 and P7 thereby providing illumination for the pick-up position. An indicator lamp P-8 in lead 428 is illuminated to indicate that power for the lighting system is on.

Power switch PS-2 is depressed and maintained closed to energize a circuit via leads 427 and 428, switch PS-2, lead 432, lead 433, and a temperature controller, generally designated 434, to the substrate heating element 123 and the thermal head heating elements 208. Since the temperature controller is a well known component, no further amplification or description is believed necessary, it being understood that such controller maintains heating elements 123 and 208 within desired temperature ranges. If desired, a separate temperature controller can be employed for substrate heating element 123. Simultaneously, indicator lamp P2 in lead 435 is illuminated to indicate that the various heaters are energized.

With a substrate 42 placed on the upper surface of table 117 over the end of vacuum passage 126 to maintain substrate 42 in place, slide 95 is shifted to the chip pick-up position with cam 105 engaging limit switch LS-1 to close the latter. With chip holder assembly 130 positioned beneath the optical system, the operator now looks through eyepieces 150 to align the superimposed images of a chip 40 on tray 145 and a compliant member 45 disposed on the lowermost ram 202 of bonding head 201. FIG. 5 illustrates a typical image initially observed by the operator whereby chip 40 is misaligned relative to compliant member opening 47. The operator then manipulates control knob 72 to displace carriage 63 in the necessary X–Y directions until the outline of chip 40 is contained within opening 47. If necessary, carriage 63 can be rotated in a horizontal plane by means of slide shift lever 106.

When the images of chip 40 and compliant frame opening 47 are aligned, the operator momentarily depresses push button switch PB-1 to complete a circuit via closed switch LS-1, switch PB-1, lead 436, normally closed contacts 2RY-2 to energize relay 1RY for closing normally open contacts 1RY-1, 1RY-2 and 1RY-3. Simultaneously, indicator lamp P3 is illuminated to indicate that the chip pick-up operation is under way. Since limit switch LS-2 had been previously closed, a holding circuit is completed for relay 1RY through switch LS-1, lead 437, switch LS-2, lead 438, contacts 1RY-1 and leads 440 and 441 allowing push button switch PB-1 to be returned to its normally open position. With contacts 1RY-2 closed, a circuit is completed via lead 437, contacts 1RY-2 in lead 439 and lead 442 to energize the chip pick-up motor 1M for starting the same. This effects rotation of crank 340 and movement of rod 343 to move carriage 297 downwardly. As carriage 297 moves downwardly, carrying with it tool block 218, cam follower roller 190 of rod 191 engages cam surface 187 of segment 186 to swing arm 155 and thereby the beam splitter assembly about pivot shaft 160 out of the way of the descending carriage. Of course, when carriage 297 is retracted to its elevated position, the spring loaded arm 155 and beam splitter assembly are returned to their original positions.

Just prior to carriage 297 reaching the bottom of its stroke and as crank 340 reaches approximately the 180° position of its cycle, normally open limit switch LS-3 is closed to complete a circuit via lead 428, switch LS-3, previously closed contacts 1RY-3, normally closed contacts BCR-2 and lead 443 to energize relay 2RY and vacuum solenoid valve SV-1 in lead 445. Energization of solenoid valve SV-1 connects the vacuum source to conduit 214 and passages 213 and 212 in bonding head 202 and ram 201 just about the time that ram 202 engages chip 40 to secure the latter thereto. Thus, vacuum is applied to ram 202 at precisely the proper time, approximately within the last 0.5 ml. of downward travel of ram 202 for example, to avoid the possibility of chip 40 being prematurely attracted to ram 202 and displaced or misaligned relative to compliant frame opening 47 during the pick-up operation. In the event ram 202 engages a selected chip 40 with excessive force, the resiliently supported tray 145 will yield to prevent damage to such selected chip with the force being absorbed by springs 142. Energization of relay 2RY closes normally open contacts 2RY-1 in lead 446 to provide a holding circuit for 2RY and SV-1 via normally closed contacts 4RY-1 and BCR-2 in lead 443. The energized relay 2RY also is effective to close normally open contacts 2RY-3 in lead 447 to condition the circuit for the reject operation, if necessary, and to open normally closed contacts 2RY-2 to prevent energization of the pick-up circuitry in the event of inadvertent or accidental actuation of push button PB-1.

Motor 1M continues to operate, rotating crank 340 to raise carriage 297 and bonding head 201 therewith with chip 40 attached to ram 202. When crank 340 reaches the 360° position of its cycle, LS-2 is momentarily opened by nut 358 on crank 340 to interrupt the holding circuit for control relay 1RY. Deenergization of relay 1RY opens previously closed contacts 1RY-1, 1RY-2 and 1RY-3. With contacts 1RY-2 opened, the energizing circuit for motor 1M is interrupted to terminate operation of the latter.

The operator now examines the alignment of chip 40 relative to compliant member 45 on ram 202 through microscope assembly 146. If the alignment is correct, i.e., if the outline of chip 40 fits entirely within compliant frame opening 47 with the compliant frame engaging all leads 51, as illustrated in FIG. 6, slide 95 is shifted to the bonding position for the next sequential operation. If the alignment is not correct, or if chip 40 is deformed or otherwise damaged, the operator momentarily depresses reject button PB-2 to complete a circuit through lead 437, PB-2, previously closed contacts 2RY-3 and lead 447, energizing control relay 3RY. Energization of relay 3RY closes normally open contacts 3RY-1 in lead 448, 3RY-2 in lead 442, and 3RY-3 in lead 450. Simultaneously, indicator lamp P4 in lead 451 is illuminated to indicate that the reject operation is in progress. The closing of contacts 3RY-2 in lead 442 energizes chip pick-up motor 1M which immediately effects closing of limit switch LS-2 and downward movement of carriage 297. With contacts 3RY-1 closed, a holding circuit is completed for control relay 3RY via lead 437, switch LS-2, closed contacts 3RY-1 and lead 447 allowing push button PB-2 to be returned to its normally open position. As carriage 297 approaches the bottom of its stroke and crank 340 reaches 180° of its cycle, limit switch LS-3 is actuated closed, energizing control relay 4RY via leads 437, switch LS-3, previously closed contacts 3RY-3 and lead 450. Energization of relay 4RY opens normally closed contacts 4RY-1 in lead 446, deenergizing control relay 2RY in lead 443 and vacuum solenoid SV-1 in lead 445. Deenergization of vacuum solenoid SV-1 interrupts the vaccum force in passage 212 of ram 202 to release chip 40 therefrom onto tray 145. With relay 2RY deenergized, previously closed contacts 2RY-1 in lead 446 are opened to insure an open holding circuit to relay 2RY and vacuum solenoid SV-1. Also, previously opened contacts 2RY-2 are closed in readiness for a repeat chip pick-up operation. As pick-up motor 1M continues to operate, carriage 297 is raised and as crank 340 leaves the 180° position of its cycle, switch LS-3 is opened to deenergize control relay 4RY. Deenergization of relay 4RY effects the closing of normally closed contacts 4RY-1 in lead 446. As crank 340 reaches the 360° position of its cycle, limit switch LS-2 is momentarily opened to deenergize relay 3RY in lead 447 thereby opening contacts 3RY-1 3RY-2 and 3RY-3. The opening of contacts 3RY-2 in lead 442 interrupts the energizing circuit for motor 1M causing the latter to cease operation. Another chip 40 is then aligned with compliant frame opening 47 in the manner hereinbefore described and another cycle is initiated by depressing push button PB-1 to pick up such other chip.

When an acceptable chip 40 is placed on compliant member 45 and correctly aligned therewith, slide 95 is shifted into the bonding position, bringing substrate holder assembly 112 beneath the optical system. The shifting of slide 95 from the chip pick-up position to the bonding position effects opening of limit switch LS-1 to render PB-1 and PB-2 inoperable and the closing of limit switch LS-4 to energize the bond control circuit and relay LR in lead 452. It is a feature of this invention that the electrical circuitry permits chip pick-up and reject operations only when slide 95 is in the chip pick-up position and only in their proper sequence and effects only a bonding operation when the slide 95 is shifted to the bonding station. Thus, a fail-safe arrangement is provided whereby inadvertent or negligent actuation of any of the buttons PB-1, PB-2 and PB-3 out of sequence is ineffective to energize their corresponding circuits, thereby precluding damage to the various electrical and mechanical components and workpieces.

The energization of relay LR opens normally closed contacts LR-1 and LR-3 and closes normally open contacts LR-2 and LR-4 in leads 465 and 466, respectively, to automatically vary the intensity of light emitted from lamps P-6 and P-7 via potentiometers 467 and 468, initially set by control knobs 425 and 426.

The operator now utilizes the optical system to align leads 41 of chip 40 with the conductive areas 43 on substrate 42. FIG. 7 illustrates the typical superimposed images that may be initially observed by the operator wherein the conductive areas 43 of substrate 42 are misaligned relative to their associated beam leads 41 of chip 40. The operator then manipulates control knob 72 to move carriage 63 in a manner aligning leads 41 with the conductive areas 43.

When the workpeices are correctly aligned, the operator depresses push button switch PB-3 momentarily to complete a circuit via lead 428, now closed switch LS-4, switch PB-3, normally closed contacts BCR-3 in lead 455 to energize relay BR. Energization of relay BR closes normally open contacts BR-1 in lead 456 to complete a holding circuit for relay BR, allowing switch PB-3 to be returned to its normally open position. The energized relay BR closes normally open contacts BR-2 in lead 457 to complete an energizing circuit for motor 2M via lead 428, switch LS-4, closed contacts BR-2, limit switch LS-5 and lead 457.

Operation of motor 2M effects lowering of carriage 297 through shaft 377, crank 379, rod 380, pressure arm 257 and roller 395. Simultaneously, switch control cam 383 on shaft 377 is caused to rotate. When carriage 297 approaches the end of its stroke and crank 397 reaches the 180° position of its cycle, cam 383 is effective to actuate limit switch LS-5 to interrupt the energizing circuit for motor 2M and terminate the operation of the latter, and to complete an energizing circuit for time delay relay 1TDR in lead 458. Relay 1TDR determines the time cycle for the bonding operation as initially set by control knob 421. Also, an indicator lamp P5 in lead 460 is illuminated to indicate that the bonding cycle is in progress.

During the bonding cycle, the compliant member 45, carried by ram 202, presses the chip leads 41 against the aligned substrate conductive areas 43 and transmits the pressure and heat of ram 202 to beam leads 41 to uniformly bond the latter to the substrate conductive areas 43. As shown in FIG. 8, the aluminum material of which compliant member 45 is formed, yields and flows about beam leads 41 causing controlled deformation of such leads to achieve a uniform, high quality bond between each beam lead 41 and its corresponding conductive area 43, regardless of variations in the thicknesses of the beam leads or surface irregularities therein. The thickness of compliant member 45 exceeds the thickness of chip 40 to preclude any direct contact between chip 40 and the heated ram 202. Also, because of the metal flow characteristics of the aluminum compliant member 45, the possibility of shorting between the leads is eliminated and closer spacing of such leads can be realized. Also, the oxide formed on the aluminum compliant member 45 prevents adhesion to the gold leads 41 during bonding to facilitate uninterrupted production. While the material of which the compliant member 45 is formed is preferably aluminum, it should be appreciated that any suitable metal having similar heat conducting properties and metal flow characteristics can be utilized, if desired, within the purview of this invention.

Figure 30:
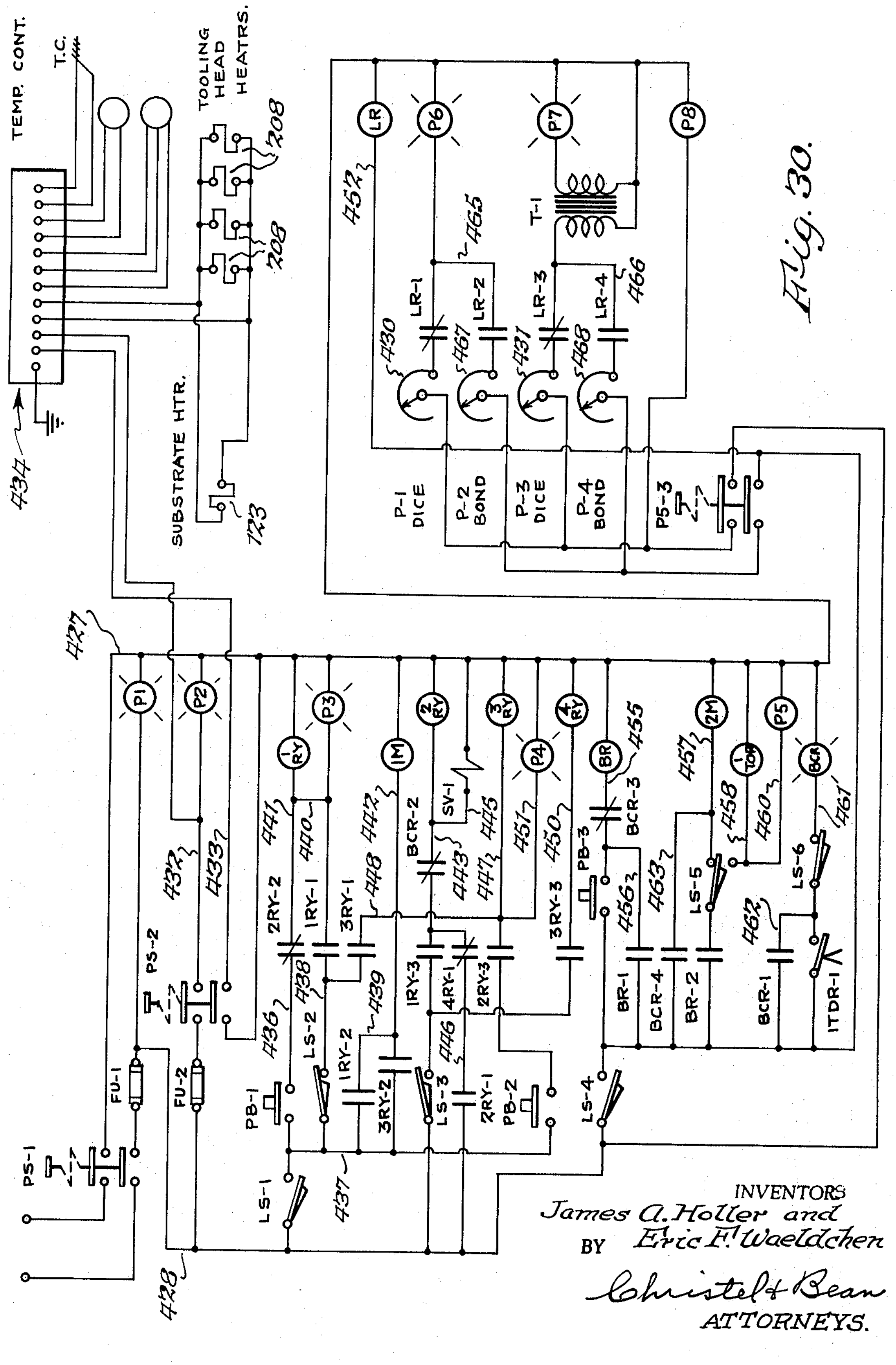

Referring now back to FIG. 30, the energization of time delay relay 1TDR effected closure of switch 1TDR-1 in lead 461 to energize relay BCR in lead 461 through limit switch LS-6, which had been closed by cam 383 during the descent of carriage 297. Energization of relay BCR closes normally open contacts BCR-1 in lead 462 and BCR-4 in lead 463 and opens normally closed contacts BCR-2 in lead 443 and BCR-3 in lead 455. The closing of contacts BCR-1 completes a holding circuit for relay BCR through lead 462. The closing of contacts BCR-4 in lead 463 completes an energizing circuit for motor 2M to raise carriage 297 and bonding ram 202 upwardly. With normally closed contacts BCR-2 opened, relay 2RY and vacuum solenoid SV-1 are deenergized. Contacts 2RY-1 are caused to open thereby holding the circuit for relay 2RY and vacuum solenoid SV-1 open. Accordingly, vacuum in passage 212 of bonding ram 202 is interrupted causing chip 40 to be released from bonding ram 202 as the latter begins its ascent. The opening of normally closed contacts BCR-3 deenergized relay BR causing contacts BR-1 and BR-2 to open. The opening of contacts BR-1 in lead 456 insures an open holding circuit for relay BR and the opening of contacts BR-2 in lead 457 insures an open circuit through limit switch LS-5 to motor 2M and time delay relay 1TDR. With the timing out of time delay relay 1TDR, the bonding cycle is completed and switch 1TDR-1 is opened.

As crank 379 leaves the 180° position of its cycle and carriage 297 begins its ascent, cam 383 actuates limit switch LS-5 insuring an open circuit to relay 1TDR. However, motor 2M is still energized via closed switch LS-4, closed contacts BCR-4 and lead 463. As carriage 297 continues upwardly by means of pin 400, bellcrank hook 398, pressure arm 257 and the crank drive arrangement operatively connected to motor 2M, the indexing mechanism (FIGS. 25 and 26) becomes operative to index bonding head 202 and crimping head 230 to replace a spent compliant member 45 with a fresh one as hereinbefore explained. It should be understood that the indexing mechanism is operative only upon upward movement of carriage 297 and tool block 218 after the bonding cycle and is locked against rotation by lever 266 the remainder of the time.

As carriage 297 approaches its uppermost position, one end of bellcrank 397 engages stationary rod 399 to effect pivoting of bellcrank 397 in a clockwise direction as viewed in FIG. 13 to unlatch hook 398 from engagement with pin 400. Thus, carriage 297 is disengaged from pressure arm 257 and is free to be reciprocated by rod 343 through crank disk 340 and motor 1M, or by hand. Carriage 297 is held in its upper position by means of the counterweight arrangement 327-332.

As crank 379 reaches the 360° position of its cycle, cam 383 is effective to actuate limit switch LS-6 to deenergize relay BCR and thereby open contacts BCR-1 and BCR-4 in leads 462 and 463, respectively, and close contacts BCR-2 and BCR-3 in leads 443 and 455, respectively. The opening of contacts BCR-1 insures an open holding circuit to relay BCR. The opening of contacts BCR-4 interrupts the energizing circuit for bonding head motor 2M, causing the latter to cease operation. The closing of contacts BCR-2 conditions the circuits of relay 2RY and vacuum solenoid SV-1 for the next cycle and the closing of contacts BCR-3 prepares the circuit of relay BR for the next cycle. Thus, an entire cycle has been completed and the apparatus of this invention is in condition to repeat the above described cycle.

FIG. 31 illustrates another form of an optical arrangement which differs from the form depicted in FIG. 19 by the addition of another reflective mirror 470 disposed at an angle of 30° to the horizontal and by orienting the objective lens of the microscope assembly 146 in such a manner so as to have its line of sight disposed at an angle of 60° to the horizontal. With this arrangement, light reflected from substrate 42 strikes the reflective surface 176 of beam splitter 175 and is reflected 90° onto mirror 470 which further reflects the light rays 120° into the objective lens of the microscope assembly 146. Light from chip 40 is reflected 90° by beam splitter 175 to the silver surface of mirror 177 and is reflected directly back on the same beam, a portion of which passes through beam splitter 175 to mirror 470 and is reflected thereby 120° to the objective lens of microscope assembly 146. Thus, true superimposed images of chip 40 and substrate 42 are observed through microscope assembly 146 and this is due to the provision of an additional mirror 470.

In order to adapt the carriage manipulating linkage to the modified form of optical system shown in FIG. 31, it is only necessary to bring the pivot axis 86 of the parallelogram linkage of FIG. 16 in registry with carriage connection 87 while maintaining bracket 85 parallel with link 78. This modification will render parallelogram linkage 76, 78, 81 and 85 a true pantograph arrangement whereby movement of knob 72 in either an X—X or Y—Y direction will effect displacement of carriage 63 in the same direction in the desired ratio.

While slide block 96 extends in a front-to-rear direction as shown in FIGS. 9 and 12 with slide 95 movable between forward and rearward positions relative to the operator positioned in front of apparatus 50, it should be appreciated that the principles of this invention envisage a slide block and a slide thereon mounted for movement in a lateral direction or normal to that shown in FIGS. 9 and 12. Such an arrangement provides more space forwardly of apparatus 50 and enables the operator to easily manipulate shift lever 106 from the side.

From the foregoing, it is apparent that the objects of the present invention have been fully accomplished. An improved apparatus and method are provided for uniformly bonding a plurality of leads of an integrated circuit simultaneously to their substrate connections, regardless of variations in the thicknesses of/or surface irregularities in the leads and the substrate. A plurality of deformable, heat and pressure transmitting members, provided in strip form, are individually mounted and crimped on successive bonding tools to transmit and evenly distribute bonding forces to the leads to effect uniform bonding thereof.

A preferred embodiment of this invention having been described in detail, it is to be understood that this has been done by way of illustration only.

We claim:

1. A bonding apparatus for simultaneously bonding the leads of a first workpiece to desired areas on a second workpiece comprising: a frame having a base, a reciprocable carriage mounted on said frame, a bonding head carried by said carriage and having at least one bonding tool thereon, drive means for reciprocating said carriage toward and away from said base and for applying pressure to said bonding tool, means for heating said bonding tool, means carried by said bonding tool and engagable with the leads of a first workpiece for transmitting pressure and heat from said bonding tool to said leads for uniformly bonding each of said leads to desired areas on a second workpiece, and means for roll crimping portions of said transmitting means about the periphery of said bonding tool to provide formations extending inwardly from the tip of said tool, said transmitting means comprising an elongated strip of material having a plurality of longitudinally spaced deformable frame members adapted to be successively carried by said bonding tools, means for roll crimping portions of said deformable frame members about the periphery of said bonding tools to provide depressed formations in said strip between adjacent bonding tools, said crimping means comprising a rotatable head located in close proximity to said bonding head and having a plurality of circumferentially spaced crimping elements thereon, and means connecting said bonding head and said crimping head for synchronous rotation whereby successive crimping elements are adapted to register with successive bonding tools to crimp said deformable members fed therebetween.

2. A bonding apparatus as set forth in claim 1 including means for adjusting said crimping head toward and away from said bonding head.

3. A bonding apparatus for simultaneously bonding the leads of a first workpiece to desired areas on a second workpiece comprising: a frame having a base, a reciprocable carriage mounted on said frame, a bonding head carried by said carriage and having at least one bonding tool thereon, drive means for reciprocating said carriage toward and away from said base and for applying pressure to said bonding tool, means for heating said bonding tool, means carried by said bonding tool and engagable with the leads of a first workpiece for transmitting pressure and heat from said bonding tool to said leads for uniformly bonding each of said leads to desired areas on a second workpiece, and means for roll crimping portions of said transmitting means about the periphery of said bonding tool to provide formations extending inwardly from the tip of said tool, a second drive means for reciprocating said carriage toward and away from said base independently of said first drive means, and control means for selectively operating said first and second drive means.

4. A bonding apparatus as set forth in claim 3 wherein said workholder includes a table having a workpiece support surface, passage means extending through said table and having on end terminating at said support surface, the other end of said passage means connected to a source of vacuum for securing said second workpiece to said support surface.

5. A bonding apparatus as set forth in claim 4 including means for heating said table.

6. A bonding apparatus for simultaneously bonding the leads of a first workpiece to desired areas on a second workpiece comprising: a frame having a base, a reciprocable carriage mounted on said frame, a bonding head carried by said carriage and having at least one bonding tool thereon, drive means for reciprocating said carriage toward and away from said base and for applying pressure to said bonding tool, means for heating said bonding tool, means carried by said bonding tool and engagable with the leads of a first workpiece for transmitting pressure and heat from said bonding tool to said leads for uniformly bonding each of said leads to desired ares on a second workpiece, and means for roll crimping portions of said transmitting means about the periphery of said bonding tool to provide formations extending inwardly from the tip of said tool, a slide mounted for reciprocable movement on said base, a work table carried by said slide for supporting a plurality of said first workpieces on a workholder mounted on said slide for supporting said second workpiece, a second drive means for reciprocating said carriage toward and away from said base independently of said first drive means, and control means for selectively operating said second drive means when said work table is in registry with said bonding tool to attach one of said first workpieces to said bonding tool and operating said first drive means when said workholder is in registry with said bonding tool to bond the leads of said first workpiece to said desired areas on said second workpiece.

7. A bonding apparatus for simultaneously bonding the leads of a first workpiece to desired areas on a second workpiece comprising: a frame having a base, a reciprocable carriage mounted on said frame, a bonding head carried by said carriage and having at least one bonding tool thereon, drive means for reciprocating said carriage toward and away from said base and for applying pressure to said bonding tool, means for heating said bonding tool, means carried by said bonding tool and engagable with the leads of a first workpiece for transmitting pressure and heat from said bonding tool to said leads for uniformly bonding each of said leads to desired areas on a second workpiece, and means for roll crimping portions of said transmitting means about the periphery of said bonding tool to provide formations extending inwardly from the tip of said tool, means for aligning said leads of said first workpiece with said desired areas on said second workpiece with said first and second workpieces being spaced apart, said alignment means including optical means for viewing said first and said second workpieces in said spaced apart relation to form superimposed images of said first and second workpieces.

8. A bonding apparatus as set forth in claim 7 including means for moving said first and second workpieces relative to each other in planes normal to the direction of travel of said carriage to align the images of said leads with said desired areas on said second workpieces.

9. A bonding apparatus as set forth in claim 7 wherein said optical means includes a microscope assembly having an objective lens, a beam splitter assembly for reflecting light rays 90° from said spaced apart first and second workpieces, and a mirror disposed in the path of said reflected light rays and interposed between said beam splitter assembly and said objective lens to further reflect said reflected light rays into the line of sight of said objective lens to form true superimposed images of said first and second workpieces.

10. A bonding apparatus as set forth in claim 8 including a holder upon which said second workpiece is carried, and hand operable linkage means operatively connected to said holder for moving the latter in directions generally normal to each other.

11. A bonding apparatus as set forth in claim 10 including a carriage upon which said workholder is mounted and wherein said linkage means includes a control lever operatively connected to a movable parallelogram linkage pivotally connected to a fixed pivot axis, said parallelogram linkage being provided with an extension projecting outwardly of the area circumscribed by said parallelogram linkage, said extension having means connecting said workholder carriage thereto whereby movement of said lever in one horizontal direction effects movement of said workholder in the same direction and movement of said lever in a direction normal to said one horizontal direction effects movement of said workholder in a reverse direction.

12. A bonding apparatus comprising: a frame having a base, a reciprocable carriage mounted on said frame for movement toward and away from said base, a rotatable shaft, a bonding head mounted on one end of said shaft and having a plurality of bonding tools thereon, means for indexing said bonding head to bring successive bonding tools into a bonding position, said indexing means comprising a pin wheel assembly mounted on the other end of said shaft, a plurality of circumferentially spaced studs on said assembly, a lever pivotally mounted on said frame and provided with a stud engaging detent, means biasing said lever toward said pin wheel assembly whereby said detent is in the path of movement of one of said studs upon moving said carriage away from said base and relative to said lever to effect rotation of said shaft through a predetermined arcuate extent.

13. A bonding apparatus as set forth in claim 12 wherein said lever is provided with a second detent engagable by a stud adjacent said one stud for shifting said lever against the force of said biasing means to disengage said one stud from said first mentioned detent upon further movement of said carriage away from said base.

14. A bonding apparatus as set forth in claim 13 including means for locking said bonding head in an indexed position before and after the indexing operation.

15. A bonding apparatus as set forth in claim 14 wherein said locking means comprises a pivotal lever carried by said carriage and having a notch in one longitudinal edge thereof, means biasing said lever toward said pin wheel assembly to engage said notch about a stud remotely spaced from said one stud.

16. A bonding apparatus as set forth in claim 15 including a cam on the distal end of said first mentioned lever engagable with said locking lever to disengage said notch from said remotely spaced stud prior to the engagement of said one stud with said first mentioned detent.

* * * * *